March 22, 1966     S. A. SMITH ET AL     3,241,845
BONDED SEALS

Filed Sept. 14, 1961     2 Sheets-Sheet 1

INVENTORS
STANLEY A. SMITH
WARREN W. RASMUSSEN by Cromwell, Greist & Warden
Attys.

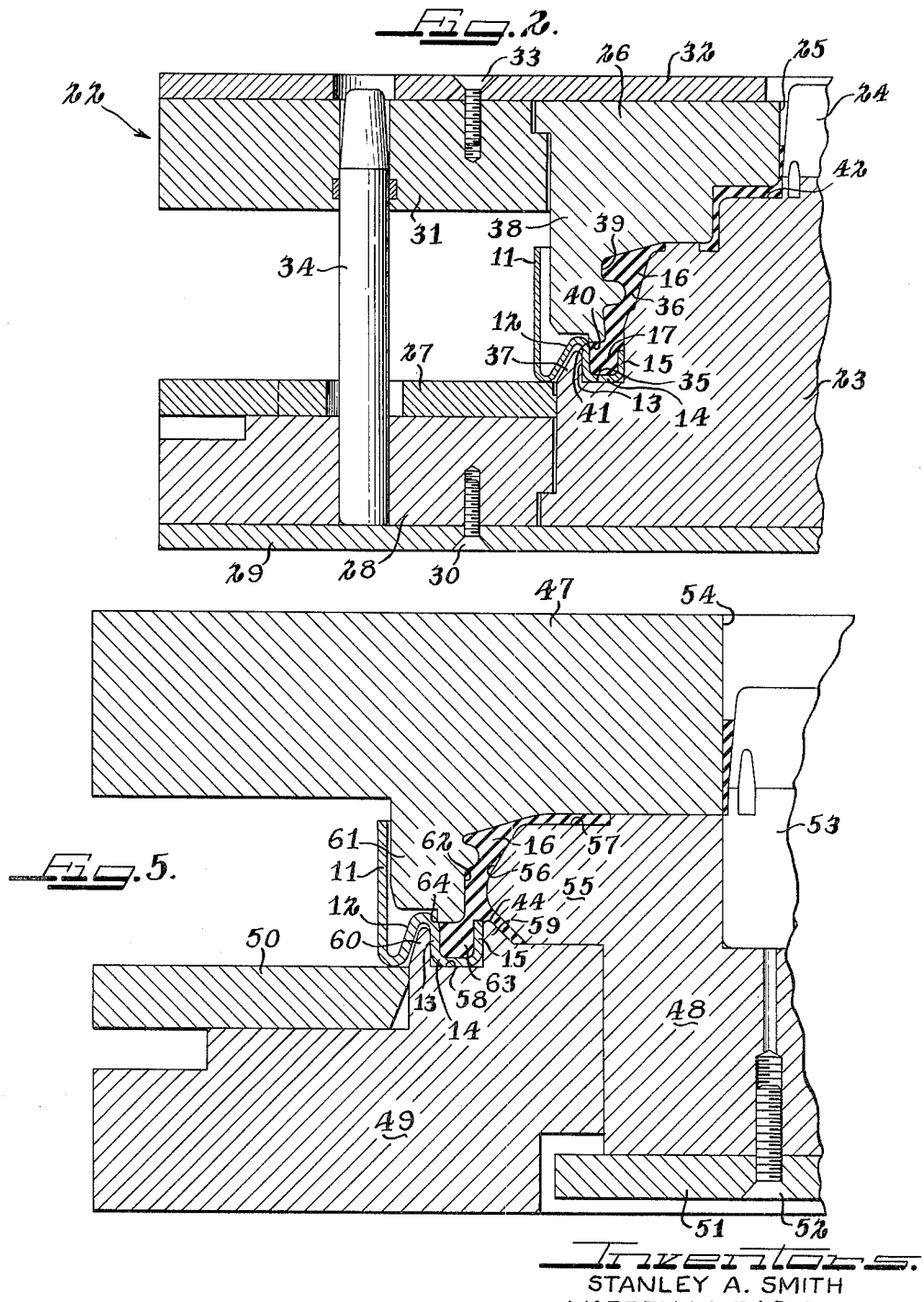

United States Patent Office 3,241,845
Patented Mar. 22, 1966

3,241,845
BONDED SEALS
Stanley A. Smith, Elgin, and Warren W. Rasmussen, Elmhurst, Ill., assignors to Chicago Rawhide Manufacturing Company, Chicago, Ill., a corporation of Illinois
Filed Sept. 14, 1961, Ser. No. 138,142
3 Claims. (Cl. 277—182)

The invention relates to a new and improved type of bonded oil seal. More specifically, the invention deals with an improved W-type stamping bonded seal without "flash" formation along surface portions of the stamping adjacent sealing member bonding areas.

Various forms of W-type stampings used in forming an oil seal having a sealing member clamped by the stamping are well known such as shown in the Winter Patent Nos. 2,089,461 and 2,089,642. The basic W-type stamping was originally designed for the provision of an annular, generally U-shaped sealing member attaching portion into which an edge of a sealing member or lip is inserted and then clamped by the bending of a free leg segment of the mounting portion toward the opposite leg segment thereof. To this extent the W-type stamping has been used successfully particularly in the clamped mounting of a leather seal.

With the widespread use of molded rubber or other homogeneous resinous material in the forming of sealing members, various types of molds have been used which are adapted to receive therein a stamping and, during shaping of the rubber to form the sealing member, provide for simultaneous bonding of the sealing member to the stamping. Problems have arisen with regard to obtaining an adequate bond capable of establishing and maintaining attachment between the sealing member and stamping during subsequent extended use of the seal. Several different oil seal designs have been utilized in an effort to improve the bonded characteristics of the sealing member and stamping. By way of example, widespread use has been made of a design wherein the stamping portion to which the sealing member is bonded is provided with spaced grooves or openings which are filled by the resinous material with this material completely overlying the stamping portion to an extent that the latter is substantially embedded in the sealing member. With these various designs, the problem of "flash" control or elimination has always been present. As is well recognized, it is desirable to eliminate "flash" established by a thin non-functional film of rubber spread over the stamping area immediately adjacent the sealing member bonding or attachment area. The oil seal industry has resorted to finishing or cleaning procedures to remove the "flash" following removal of the completed seal from the mold. Such procedures add substantially to the overall cost of fabrication of the seal.

It is an object of the invention to provide a new and improved bonded seal wherein a resinous flexible sealing member is bonded to a sealing member mounting portion of a casing or stamping, the bonded attachment being improved by the utilization of a generally U-shaped mounting portion which is completely filled with a sealing member base portion and which fully confines the base portion, the mounting portion further providing means for backing up a diaphragm portion of the sealing member.

Another object is to provide a new and improved W-type oil seal including a unique bonded attachment between a resinous flexible sealing member forming a part thereof and a W-type stamping.

Other objects not specifically set forth will become apparent from the following detailed description of the invention made in conjunction with the accompanying drawings wherein:

FIG. 2 is a cross sectional half view of a special mold capable of forming the seal of FIG. 1;

FIG. 5 is a view similar to FIG. 2 illustrating the mold used in forming the seal of FIG. 4.

Figure 1:
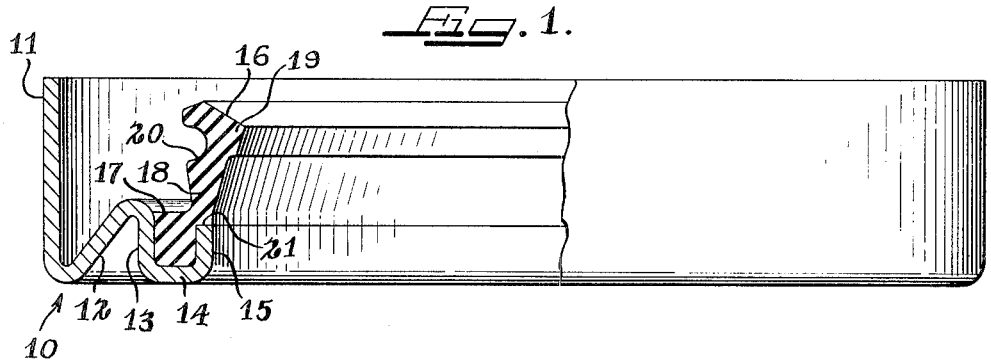
FIG. 1 is a fragmentary section of one form of improved oil seal.

In general, the new and improved oil seal of the invention includes the use of a casing of generally W-shape having an annular U-shaped sealing member mounting portion in which the base portion of a flexible resinous sealing member is received in bonded relation with the inner surfaces of the mounting portion, the base portion projecting from the mounting portion and having formed integral therewith a flexible diaphragm portion and sealing lip, the diaphragm portion overlying a radial edge surface of the mounting portion and being bonded thereto in backed-up relation. The seal 10 of FIG. 1 includes these features. This seal is formed from a generally W-shaped stamping which includes an axially extending seal mounting portion 11 integrally joined with a radially inwardly inclined segment 12 as viewed, this segment being integrally joined with the outermost axially directed leg segment 13 of a radially inwardly offset sealing member mounting portion of generally annular U-shape, which mounting portion includes in addition to the leg segment 13, a base segment 14 and an opposite free leg segment 15. The leg segments 13 and 15 are in parallel relation with the base segment 14 radially interconnecting the same.

The seal 10 includes a resinous flexible sealing member 16 formed from any suitable material such as rubber or synthetic rubber-like material. This sealing member includes a base portion 17 of block-like configuration which completely fills the interior of the U-shaped mounting portion of the stamping and is continuously bonded to the inner surfaces of the leg segments 13, 14 and 15 thereof. The base portion 17 projects to a limited extent from the mounting portion of the stamping and is integrally joined with a flexible intermediate diaphragm portion 18 which in turn is integrally joined with a sealing lip portion 19 of known configuration including a spring mounting groove 20. The diaphragm portion 18 along the inner surface thereof fully overlies the free edge 21 of the leg segment 15 of the mounting portion of the stamping and is bonded thereto throughout the extent of covering relation. In this respect the diaphragm portion 18 is, in effect, offset radially inwardly and is in attachment with the inner corner portion of the base 17 to place the same in position to be substantially backed-up by the free edge of the leg segment 15 of the stamping mounting portion.

In the finished condition of the seal 10, the parallel leg segments 13 and 15 are in completely relaxed condition maintaining their parallel relation with the sealing member base portion 17 completely filling the area therebetween. This base portion is, for all practical purposes, fully confined in the generally U-shaped mounting portion of the stamping and with this arrangement a very substantial bonding area is provided, this area being fully protected under all operating londitions. Additionally, the intermediate diaphragm portion 18 of the sealing member 16 is reinforced or backed-up in protected relation by the free edge 21 of the leg segment 15. Diaphragm portions are generally thin in shape to provide the requisite flexibility to the lip portion for movement relative to the fixed casing of a seal and such diaphragm portions are often subject to damage or excessive wear. With the arrangement described the indended functioning of the diaphragm portion 18 is retained while the same is substantially protected against damage with the additional feature of this diaphragm portion actually providing an additional area of bonded attachment along the free edge 21 which materially adds to the overall resistance to separation of the sealing member 16 from the stamping. The complete bond area providing for attachment of the sealing member 16 to the stamping is fully enclosed or covered and the general arrangement and location of this area in the manner described protects the same from the application of any substantial stress resulting from forces applied to the sealing lip portion 19. The design described is uncomplicated and provides complete protection to the bond area establishing connection between the sealing member and the stamping. Sealing member shaping and bonding to the stamping may be readily accomplished as will be described.

FIG. 2 illustrates a mold 22 used in forming the seal 10. This mold includes cooperating top and bottom plate structures which receive therebetween the stamping and a biscuit of resinous stock material, and which upon closing, cooperatively shape the stock material to form the sealing member and while doing so, cause the stock material to flow into filling bonded relation with the mounting portion of the stamping. The bottom plate structure includes a center bottom die member 23 having a projecting center pin 24 mounted thereon and received in a central opening 25 in a top die member 26 forming a part of the top plate structure. The bottom die member 23 has received thereabout a radially directed stamping abutment plate 27 of annular configuration which is mounted on an annular spacer plate 28. A bottom cover plate 29 extends across the spacer plate 28 and bottom die member 23 and is suitably attached thereto by fasteners 30. The top plate structure includes the top die member 26 and an annular guide plate 31 received thereabout and having attached thereto a top cover plate 32 by means of fasteners 33. A plurality of circumferentially spaced guide pins 34 extend upwardly from the bottom plate structure and are received in aligned apertures in the plates 31 and 32.

The bottom die member 23 is formed with an annular, upwardly opening groove 35 in which is snugly received the U-shaped mounting portion of the stamping. The inner wall portion of the groove 35 extends upwardly therefrom and is shaped along the upper extension, generally designated by the numeral 36, to form the sealing member 16. This area 36 of the bottom die member may take any desired shape depending upon the intended final configuration of the sealing member. However, the upward extension of the inner side wall portion of the groove 35 must be such to define the offset diaphragm portion bonded to the free edge of the leg segment 15 previously described.

The opposite or outer side wall portion of the groove 35 is defined by an annular upstanding ridge 37 the outer surface of which is inclined to generally parallel the intermediate segment 12 of the stamping in spaced relation therewith. The height of the ridge 37 is such that the inner vertical surface thereof adequately supports and engages the leg segment 13 but a clearance is established between the top edge of the ridge 37 and the stamping to prevent stamping bottoming thereon. The arcuate area of juncture of the axially directed segment 11 of the intermediate segment 12 of the stamping is placed in resting engagement on the top surface of the abutment plate 27. This top surface is in radial alignment with the bottom surface of the groove.

The top die member 26 is formed with an annular depending rim-like portion 38 the inner surface of which is shaped along the general area designated by the numeral 39 to conform to the final shaping of the sealing member 16 including the spring mounting groove 20 thereof.

The outer surface of the depending portion 38 is generally vertical for substantial clearance inwardly of the axially directed segment 11 of the stamping. The bottom edge of the depending portion 38 is formed with a downwardly projecting shoulder portion 40 located adjacent the inner surface area 39. The outermost edge 41 of the shoulder portion 40 is of generally sharp, right angle configuration to define a land which engages the stamping just outwardly of the U-shaped mounting portion and adjacent the juncture of the leg segments 12 and 13. The outermost surface portion of the bottom of the depending portion 38 is recessed sufficiently to maintain clearance with the stamping when the mold is completely closed as illustrated in FIG. 2.

The operation of the mold 22 involves the placing of the stamping in operative position on the bottom die member 23 when the mold is open. Suitable stock material is placed on the annular surface portion 42 of the bottom die member 23 and the top plate structure is put in place and pressure is applied to close the mold assembly. Movement of the top and bottom plate structures toward one another result in the flow of stock material into the area defined between the surface portions 36 and 39 and downwardly toward the mounting portion of the stamping. The land 41 engages the stamping and this engagement may be used to force the mounting portion of the stamping down into the groove 35 or the stamping may be pressed into the groove 35 prior to mold closing. The mold parts are dimensioned to provide for flow of stock material into the mounting portion of the stamping upon engagement of the land 41 with the stamping and bottoming of the stamping in the groove 35 and against the abutment plate 27. Complete closing of the mold results in adequate embedding of the land 41 in the material of the stamping to prevent the flow of stock material outwardly of the mounting portion along the adjacent surface of the stamping. In this uncomplicated matter the formation of "flash" beyond the base portion 17 of the sealing member is eliminated.

To eliminate "flash" formation along the outer surfaces of the leg segments 13, 14 and 15 of the mounting portion of the stamping, the groove 35 is dimensioned to snugly and tightly receive the mounting portion therein. The opposite side surfaces of the groove 35 engage the outer surfaces of the leg segments 13 and 15 in tight coextensive relation thus preventing flow of stock material therebetween. The amount of surface area contact is substantial by reason of the design of the groove and the shape of the stamping and this factor materially aids in the control of stock material flow. As is conventional, adequate heat is applied during the molding operation to provide for stock material flow, curing and bonding thereof.

Figure 3:
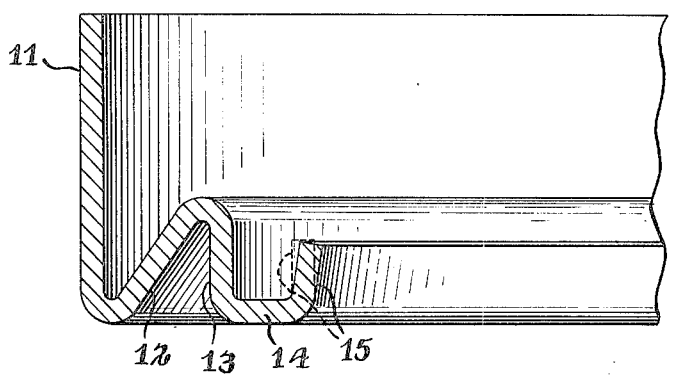
FIG. 3 is a cross sectional half view of the stamping used in forming the seal of FIG. 1, the stamping being illustrated prior to insertion in the mold of FIG. 2.

If desired, the stamping may be in the form illustrated in FIG. 3 prior to insertion in the mold. In this form the free leg segment 15 of the mounting portion of the stamping is slightly inclined inwardly away from the opposite leg segment 13. Upon insertion of the mounting portion in the groove 35 of the mold, the leg segment 15 is bent inwardly into parallel relation with the leg segment 13 as indicated in broken lines in FIG. 3. The bending is of a permanent nature to fix the leg segment 15 in this final position and during bending thereof, intimate contact is maintained and established between the surface of the leg segment in engagement with the side surface of the groove 35. In this manner an added precaution may be relied upon to prevent the formation of "flash" along any outer surface portion of the mounting portion of the stamping.

Figure 4:
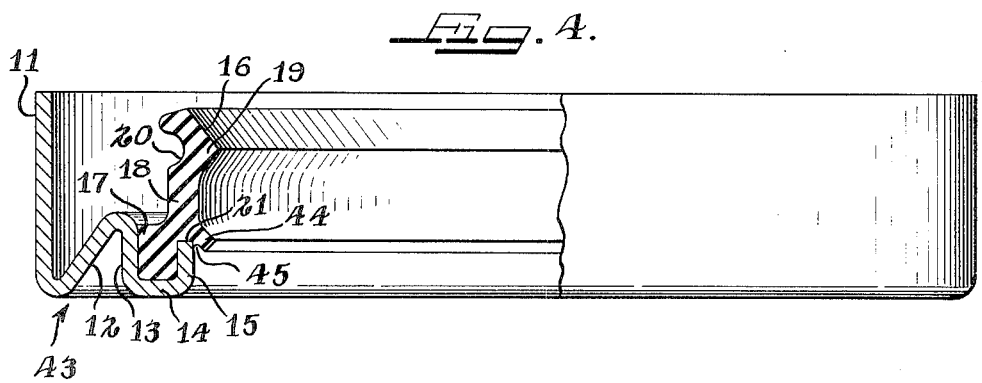
FIG. 4 is a view similar to FIG. 1 illustrating a modified form of seal.

Certain modifications of seal configuration can be made within the scope of the invention, one such modification being illustrated in FIG. 4. The seal 43 of FIG. 4 is basically of the same design as the seal 10 described above and similar parts thereof are identified by the same reference numerals. The main modification occurring in the seal 43 involves the provision of a reversely inclined secondary sealing lip 44 formed integrally with the diaphragm portion 18 of the sealing member 16 and located outwardly of the sealing member mounting portion of the stamping and directed rearwardly relative thereto. The secondary sealing lip 44 can function as a wiper member or dirt excluder and its efficiency in performing this function is enhanced by the proximity of the strengthening or rigidifying leg segment 15 with its free edge 21 bonded to the diaphragm portion 18 immediately outwardly of the sealing lip 44. A base portion 45 of the sealing lip 44 overextends the adjacent edge of the leg segment 15 in bonded relation therewith.

FIG. 5 illustrates a suitable mold 46 capable of forming the seal 43. This mold generally comprises a top plate 47 and a bottom plate structure including a center core member 48, an annular die plate 49, an annular stamping abutment plate 50 and a lock plate 51 attached to the center core 48 by suitable fasteners 52. The center core has mounted therein a center pin 53 which is received in a center bore 54 of the top plate. The center core 48 includes an annular, radially projecting die portion 55 provided with an outer sealing member shaping surface 56 which functions to shape the lip portions 19 and 44. A top surface portion 57 receives the resinous stock material thereon prior to closing of the mold. The die plate 39 is formed with an annular upwardly opening groove 58 which is identical in function to the groove 35 previously described. The groove 58 is formed from an inner upstanding rim 59 the outer surface of which is vertical to define a groove side wall and the inner surface of which is inclined and joined with the outer surface through an arcuate top surface. The rim 59 functions cooperatively with the sealing member shaping surface 56 and leg segment 15 of the stamping to form the secondary sealing lip portion 44 previously described. The outer vertical wall surface of the groove 58 is defined by an annular upstanding rib 60 which is of a shape similar to the rib 37 previously described and functions in the same manner. The top plate 47 is provided with an annular depending portion 61 the inner surface area 62 of which cooperatively functions with the surface area 56 to shape the sealing member. The bottom surface of the portion 61 is formed with a depending shoulder portion 63 the outermost edge 64 of which constitutes a relatively sharp land which becomes embedded in the stamping to prevent the formation of "flash." The stamping abutment plate 50 aids in supporting the stamping in the mold and the mold operates in the same manner as previously described.

From a comparison of the molds 22 and 46, it will be apparent that variations in sealing member shape may be resorted to while retaining the advantages of establishing an improved bond and "flashless" parts. The provision of a substantial bonding area, protection of the bonding area against operational stresses, and mold design simplicity leads to new and improved results. It will be noted that the basic design concepts of the top plates of each of the molds described are sufficiently similar to permit interchangeability in the fabrication of seals having sealing members of varying configurations.

Obviously certain modifications and variations of the invention as hereinbefore set forth may be made without departing from the spirit and scope thereof, and therefore only such limitations should be imposed as are indicated in the appended claims.

We claim:

1. An oil seal comprising a casing having an axially extending mounting portion and a radially offset sealing member mounting portion, said sealing member mounting portion being of annular U-shape with the inner side surfaces thereof in unstressed parallel relation, and a sealing member formed from homogeneous resinous material including a base portion of block-like configuration filling said sealing member mounting portion and continuously bonded and molded in unstressed condition to the inner surfaces thereof, said base portion having formed integral therewith an axially projecting and radially offset flexible diaphragm portion and a sealing lip portion, said diaphragm portion including a projecting portion which overlies an edge surface of said sealing member mounting portion and is bonded thereto in backed-up relation thereby, said sealing member mounting portion fully confining substantially all of said sealing member base portion.

2. An oil seal comprising a casing of generally W-shape having an axially extending mounting portion and a radially offset sealing member mounting portion, said sealing member mounting portion being of axially opening, annular U-shape having spaced unstressed leg portions with the inner side surfaces thereof in parallel relation, and a sealing member formed from homogeneous resinous material including a base portion of block-like configuration filling said sealing member mounting portion and continuously bonded and molded in unstressed condition to the inner surfaces of the leg portions thereof, said base portion having formed integral therewith an axially projecting and radially offset flexible diaphragm portion and a sealing lip portion, a radial end portion of said diaphragm portion overlying a radial edge surface of of a leg portion of said sealing member mounting portion and being bonded thereto in backed-up relation thereby, said sealing member mounting portion fully confining substantially all of sealing member base portion.

3. An oil seal comprising a casing of generally W-shape having an axially extending mounting portion and a radially offset sealing member mounting portion, said sealing member mounting portion being of axially opening, annular U-shape spaced unstressed leg portions with the inner side surfaces thereof in parallel relation, and a sealing member formed from homogeneous resinous material including a base portion of block-like configuration filling said sealing member mounting portion and continuously bonded and molded in unstressed condition to the inner surfaces of the leg portions thereof, said base portion having formed integral therewith an axially projecting and radially offset flexible diaphragm portion and a sealing lip portion, a radial end portion of said diaphragm portion overlying a radial edge surface of a leg portion of said sealing member mounting portion and being bonded thereto in backed-up relation thereby, said sealing member mounting portion fully confining substantially all of sealing member base portion, said diaphragm portion further having formed integral therewith immediately adjacent said edge surface of said sealing member mounting portion a reversely inclined secondary seal lip located outwardly of said sealing member mounting portion and directed rearwardly relative thereto.

References Cited by the Examiner

UNITED STATES PATENTS

| | | | |
|---|---|---|---|
| 2,145,928 | 2/1939 | Heinze et al. | 277—52 |
| 2,264,062 | 11/1941 | Wilder | 277—153 |
| 2,316,713 | 4/1943 | Proctor | 277—153 |
| 2,435,943 | 2/1948 | Nehls | 277—50 |
| 2,471,679 | 5/1949 | Gardner | 277—50 |
| 2,879,114 | 3/1959 | Bowen | 277—35 |
| 2,949,635 | 8/1960 | Chiero | 18—36 |
| 3,004,298 | 10/1961 | Hynie | 277—58 X |
| 3,018,519 | 1/1962 | Morin et al. | 18—36 |

LAVERNE D. GEIGER, *Primary Examiner.*

WILLIAM FELDMAN, EDWARD V. BENHAM, M. CARY NELSON, *Examiners.*